United States Patent [19]

Jones, Jr. et al.

[11] 4,280,179

[45] Jul. 21, 1981

[54] POSTAGE METER HAVING INTERACTIVE ARITHMETIC OPERATION CAPABILITY

[75] Inventors: Howell A. Jones, Jr., Fairfield; Robert B. McFiggans, Stamford, both of Conn.

[73] Assignee: Pitney Bowes Inc., Stamford, Conn.

[21] Appl. No.: 89,424

[22] Filed: Oct. 30, 1979

[51] Int. Cl.³ .................................... G06F 15/20

[52] U.S. Cl. .................................... 364/464; 364/466; 364/900

[58] Field of Search ................ 364/200 MS File, 464, 364/466, 900 MS File, 705

[56] References Cited

U.S. PATENT DOCUMENTS

| | | | |
|---|---|---|---|
| 4,051,913 | 10/1977 | Gudea | 364/466 X |
| 4,097,923 | 6/1978 | Eckert, Jr. et al. | 364/900 |
| 4,139,892 | 2/1979 | Gudea et al. | 364/466 X |

*Primary Examiner*—Jerry Smith
*Attorney, Agent, or Firm*—David E. Pitchenik; William D. Soltow, Jr.; Albert W. Scribner

[57] ABSTRACT

An electronic, postage meter has a keyboard with numeric keys for entering postage values, a display, a set key and an arithmetic key. Circuitry within the postage meter is responsive to the depression of the arithmetic key for modifying a displayed amount in accordance with the next value entered on the keyboard, and is responsive to depression of the set key for enabling the printing of postage in accordance with the displayed value. The arithmetic function key may effect the simple addition of the old value in the display and the newly keyed-in function.

13 Claims, 18 Drawing Figures

POSTAGE METER HAVING INTERACTIVE ARITHMETIC OPERATION CAPABILITY

This invention relates to electronic postage meters, and is more particularly directed to an electronic postage meter of the type having a keyboard for the entry of postage to be printed, a display for displaying postage to be printed as well as other data, an electronic counting device, and a printing mechanism.

Devices of the above type are generally known, and are discussed, for example, in U.S. Pat. No. 3,978,457. This reference discloses a system for a postal meter including keyboard for the manual introduction of data corresponding to the postage to be printed.

A further series of devices has been disclosed, for example, in U.S. Pat. No. 3,951,221, wherein a signal corresponding to postage to be set in a postage meter is derived as a function of a number of variables, such as weight, postal zone, postal service, time, etc., in an external computing system. Systems of this type, however, incorporate scales or the like, as well as electronic look-up tables, thereby inhibiting their use in many applications such as in offices requiring only the occasional use of a postage meter.

As a consequence, in the provision of electronic postal meters as hitherto contemplated, it has usually been necessary for an operator to precalculate the total postage amount required for a given package, prior to the introduction of any data in the keyboard of the postal meter, in the same manner that was generally required for earlier completely mechanical devices.

The present invention is therefore directed to an improved electronic postal meter, wherein a keyboard is provided on the postage meter itself for the entry of postage values, and the meter is further provided with one or more arithmetic function capabilities, including at least an adding function, whereby either a manually entered display or a postage setting display may be modified and set into the print wheels without the necessity for external calculation of a number of values or manual re-entry of the setting value display.

In accordance with one modification of the invention, the calculation function may be effected in a similar manner to that conventionally employed in hand-held calculators, by the use of an arithmetic calculator chip or the like. In a more advanced and improved modification of the invention, however, the postage meter is provided with a program more positively directed to the requirements of a postage meter and other functions to be achieved thereby, whereby the data may be processed with a minimum of additional hardware. This latter approach is possible in view of the minimized cost of the equipment, as well as the improved versatility of the solution.

In order that the invention will be more clearly understood, it will now be disclosed in greater detail with reference to the accompanying drawings, wherein.

Figure 1:
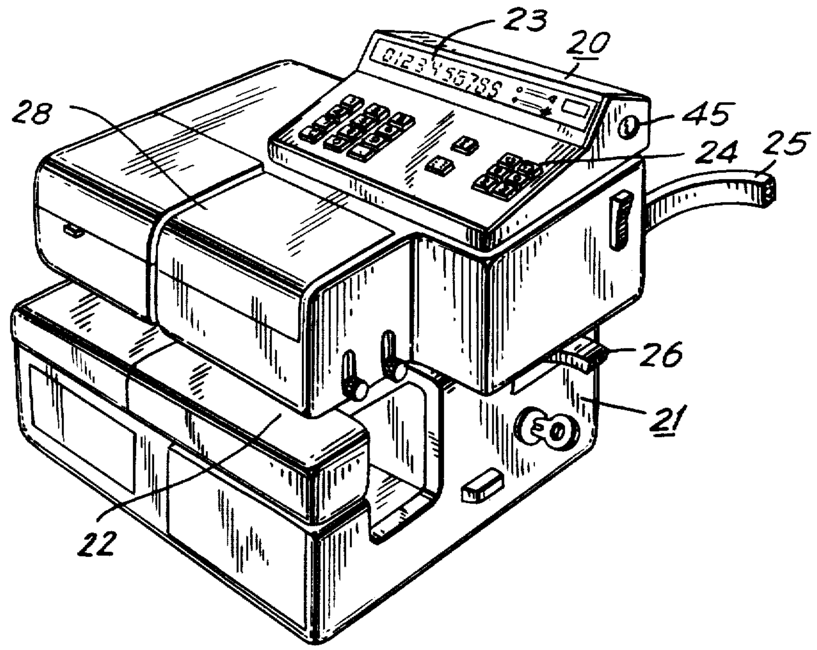
FIG. 1 is a simplified perspective view of a postal meter which may incorporate the system of the present invention.

Referring now to the drawings, and more in particular to FIG. 1, therein is illustrated a postage meter 20 removably affixed to a base 21, in accordance with one embodiment of the invention. In this arrangement, a slot 22 is provided between the postage meter 20 and the base 21 at the forward edge thereof, for receiving envelopes or the like and the printing of postage thereon. The postage meter is provided with a display panel 23, preferably an electronic display device, as well as a control panel 24 which may be organized in a manner to be disclosed in the following paragraphs. The apparatus may be energized by way of a supply cable 25.

The postage meter 20 illustrated in FIG. 1 may be of the type that is removable from the base 21, and the base 21 may be of the type disclosed, for example, in U.S. Pat. No. 2,934,009, Bach, et al, incorporating a mechanical drive for operation of the printing mechanism in the meter 20. The separability of the meter and base renders the electronic meter compatible with conventional driving units, simplifies servicing of the device and, if necessary, simplifies transport of the meter for recharging if remote charging capabilities are not employed.

Figure 2:
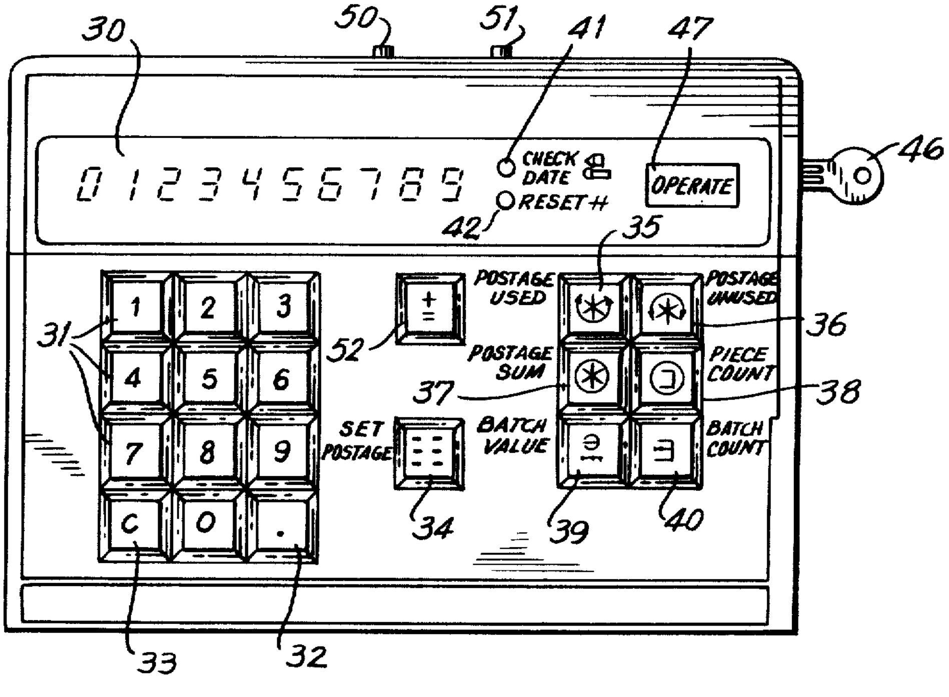
FIG. 2 is an enlarged view of the panel of the postal meter of FIG. 1.

The panel for the postage meter is clearly illustrated in FIG. 2, wherein it is seen that the meter is provided with a numeric display 30, for example, a conventional multiplexed seven-segment LED or LCD display. In addition, the keyboard is provided with numeric setting keys 31 and a decimal key 32 operative therewith, for setting the meter to print a desired amount of postage, the amount normally being displayed on the display 30. A clear key 33 may also be provided to clear the display amount in the event, for example, of an erroneous entry. When the displayed amount has been set to the desired value, depression of a set postage key 34 effects setting of the print wheels for setting postage The panel may further be provided with a series of keys enabling the selective display of other values on the display 30. For example, depression of a key 35 may enable the display of the contents of an ascending register, i.e., the postage used by the meter, and depression of a key 36 may enable display of the contents of a descending register in the meter, i.e., the postage for which the meter is still charged. Further keys 37-40 may enable display in conventional manner of other specific specialized values as control or postage sum, piece count, batch value, and batch count, respectively. The batch value and batch count registers can be cleared by simultaneous depression of either batch value key or batch count key and the clear key C. The panel additionally preferably is provided with an LED 41 which will be lit upon each application of power to the meter, as is conventionally done at the beginning of a day, to indicate that the dater has not been set or that the dater door is open. A further LED display 42 may be provided and interconnected to be lit if necessary to reset the trip mechanism in the base before operation is to continue.

In order to provide recharging of the meter, for example, by way of the keyboard, the meter may be provided with a key slot 45 illustrated in FIG. 1, in which the key 46 of FIG. 2 may be inserted. The shaft of the lock may be visible through a window 47 to display the position of the key. Thus, in the normal setting of the key this shaft may display the message "operate" as illustrated. This arrangement may also be employed for remote meter resetting, as discussed, for example, in U.S. Pat. No. 4,097,923.

As a further feature, the meter may be provided with a service switch 50 at the rear thereof for the convenience of field service personnel enabling use of the keys of the meter for different function. Upon operation of the switch 50, a service mode is entered and the keys 35 through 40 may thereby enable the display of additional values such as the unlock value, the low postage warning amount, the meter number, diagnostic status, and the maximum settable amount. Turning the key 46 and hence the corresponding lock shaft to an "enter combination" position, as indicated in the window 47, when not in service mode and while entering a correct coded combination in the keyboard, enables the recharging mode of the meter to be effective. In the charging mode, which may be attained by means of an internal switch lock controlled by the key 46, an "enter amount" position as shown by this message at the window 47, may enable entry of recharging value registers of the meter by way of the keyboard. Returning the key to the operate position enables the resumption of the use of the meter for printing postage.

The service switch may be in an unsecured position in the meter, since the display of the additional values rendered possible by the use of this switch does not affect the security of the meter, and merely enables the display of further values. The fact that it is these values that are being displayed may be shown by distinctive underlining of the display, if desired, and the operation of the service switch 50 partially disables the set postage key 34. It will then not be possible to set a new value of postage in the postage meter when it is in the "service" mode and the interposer will act to block operation of the meter in the service mode. However, the set key may still be used to cause the display of the currently set value.

When the meter is in the service mode, i.e., with the switch 50 operated, and the switch 45 and key 46 activated, the entry into the keyboard of a new value and a code indicating the function of that value, will enable the resetting of the unlock value, low warning postage amount or maximum settable amount, respectively. The "unlock" value is a determined value, for example, one dollar, including and above which the operator should be careful in setting so as to avoid accidental printing of excessive amounts. For this purpose, all values including and above the unlock value require an additional step on the part of the operator, such as an additional depression of the set postage key 34. The display may be provided with a distinctive indication, for example, one horizontal bar, to indicate that the printing wheels have been set but the unlock step, i.e., the additional depression of the set postage key, has not been effected. The completion of the unlock step would be indicated by the display, for example, of three horizontal bars to indicate that the meter is enabled to be tripped, to print postage.

If the descending register does not contain sufficient funds to cover the set amount on the print wheels, the entire display may be caused to blink. On the other hand, if the value stored in the descending register is lower than the low postage warning limit, the decimal point may be caused to blink. The "maximum settable" amount, of course, cannot be exceeded in the setting of any postage.

The meter may also be provided with a "privileged" switch 51 that is normally held in the operate position by a seal. The operation of this switch, following the cutting of the seal, enables the recharging of the meter by post office personnel in a nonremote charging mode.

In addition, the meter is provided with one or more arithmetic function keys 52, enabling a variation of the postage setting amount, such as the addition of further values to the already displayed setting value prior to the depression of the set switch 34. This feature enables the introduction by the operator of further values, such as insurance or the like, without the necessity for manual calculation or calculation on a separate device.

Figure 3:
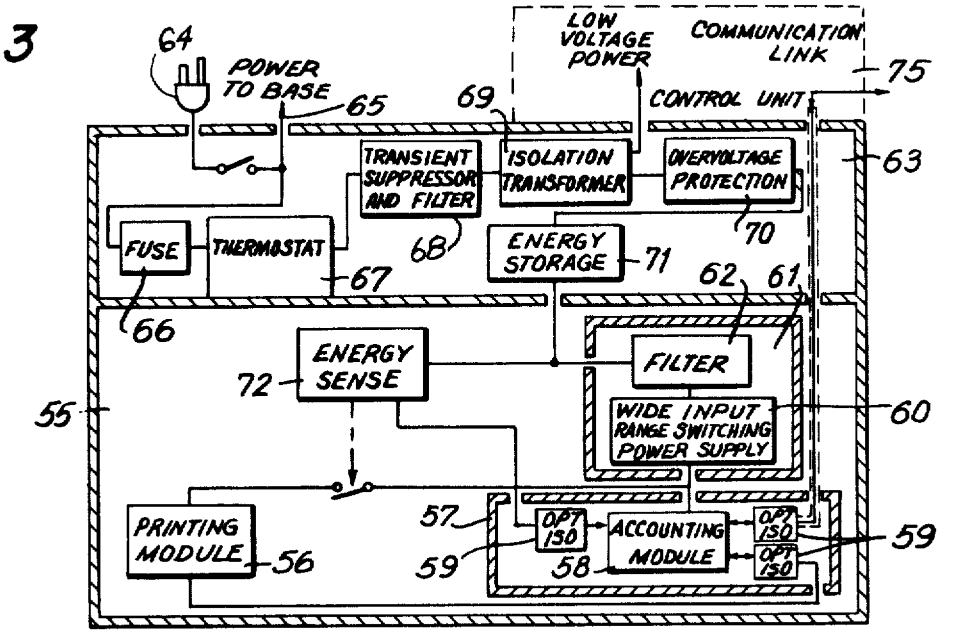
FIG. 3 is a simplified block diagram of the orientation of the elements in accordance with a preferred embodiment of the invention.

The internal components of the postage meter in accordance with the invention are preferably oriented as illustrated in FIG. 3, and include a first compartment 55 that is physically secure, i.e., as secure as is reasonably possible to avoid tampering with internal components thereof. While it may not be possible to provide 100% security in this regard, physical evidence of tampering will be evident in any event before entry can be gained. The compartment 55 encloses the printing module 56, which may include a mechanical printing assembly, and if desired, a separate microcomputer for controlling this module.

The compartment 55 also encloses a further compartment 57, which is preferably electromagnetically shielded, and encloses an accounting module 58. The accounting module is connected to external devices, i.e., external of the compartment 57, only by optical or similar isolation couplers 59 as disclosed in U.S. patent application Ser. No. 918,785 filed June 26, 1978, and now abandoned in order to avoid damage thereto, either accidental or intentional, resulting from introduction of noise, for example, excess voltages into the accounting module. Such coupling is, of course, not provided for the energy source thereof, which extends to a power supply 60 in a separate compartment 61 also within the secure compartment 55. The power supply 60 is energized by way of a filter 62 within the compartment 61, to insure the absence of any voltage variations that would adversely affect the accounting module, the power input to the compartment 61 being directed into the compartment 55 from a power supply system in a further compartment 63 that is preferably defined by the outer secure housing of the compartment 55. Thus, while it is not absolutely necessary for all the elements within the compartment 63 to be physically secure, this feature is preferred.

The power from the mains plug 64 is fed into the compartment 63, from where it may be fed by way of a suitable connection 65 to power the meter base. The power for the meter may be fused in the compartment 63, by means of a fuse 66, applied from the fuse to a thermostat 67 and thence to a transient suppressor and filter 68. The thermostat inhibits application of voltage to the unit in the event of excess temperatures. Further protection for the system is provided by means of an isolation transformer 69 and an over voltage cut-out device 70. The power for the meter is finally applied to an energy storage device 71, such as a large valued capacitor 71, the capacitor 71 having adequate energy storage to enable the self-protection features of the meter to operate, such as to transfer data to a nonvolatile memory, in the event of a power failure. The reduction of voltage may be sensed by a sensor 72 in the secure housing 55, with one output of the sensor being directed to the accounting module for signaling the necessity of a mode change, and another output (which can be mechanical) for inhibiting further printing module functions.

A further output of the isolation transformer 69 may be fed externally of the meter to a control unit 75, and one of the isolated outputs of the accounting module may be directed through the chamber 63 also to the control unit. The control unit 75 may thus constitute a keyboard control unit such as illustrated in FIG. 2, including the key switches, displays, etc., necessary for local operation of the device. It is thus apparent that the system of FIG. 3 orients the elements of the postal meter so that elements which are less critical to the security of the postal meter system are provided with successively lower levels of physical and electrical security.

Figure 4:
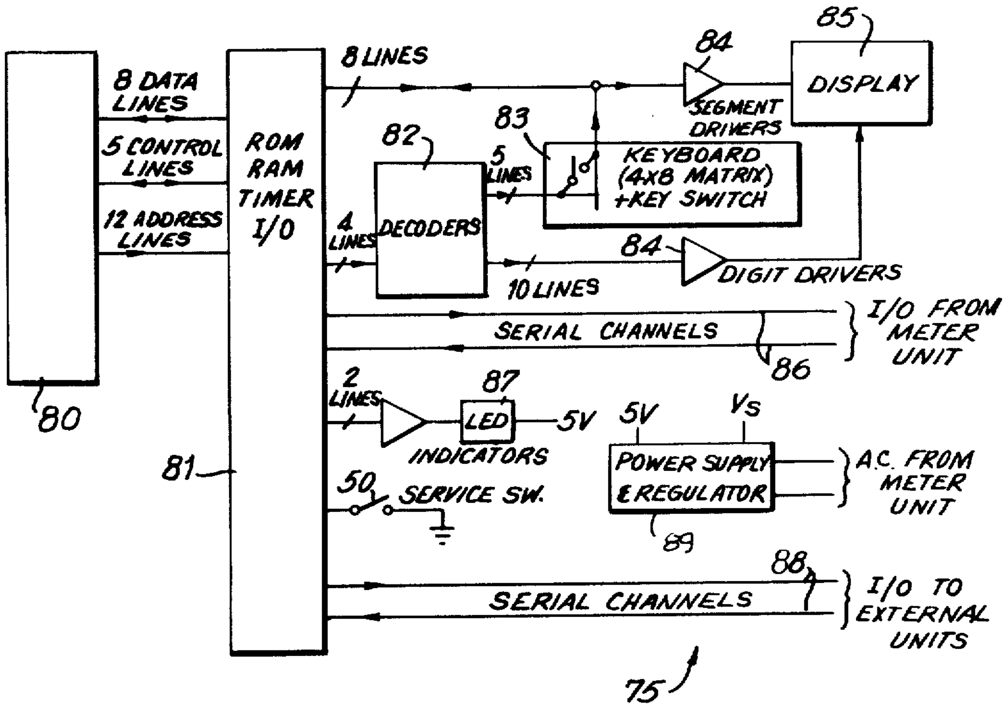
FIG. 4 is a simplified diagram of the circuitry of a control unit for a postal meter in accordance with the invention.

A preferred embodiment of a control unit 75 is illustrated in FIG. 4. This unit, for versatility in design, as well as for minimizing the noncritical elements that must be isolated in the physically secure housing, preferably incorporates a central processing unit 80, for example, of the 6500 series, and connected by way of conventional data lines, control lines and address lines to a multipurpose conventional RAM/ROM I/O timer circuit 81 incorporating read-only memories, random access memories, timing control elements and input/output interface hardware. By the use of suitable decoders 82, the keyboard 83 may thereby be scanned in the conventional fashion, and by the use of suitable drivers 84 the visual display 85 may be energized, preferably in a multiplexing mode according to conventional practice. The data relating to the depression of any of the keys of the panel may thereby be communicated to the processing unit 80, for the development of a serial input/output on the lines 86 for communication with the accounting module 58 within the secure housing 55. The processor 80 and circuit 81 are responsive to the requirement for operator interventions to recock the trigger mechanism in the base, and the failure to open or close the dater door 28 (FIG. 1) following application of power to the unit, to energize selectively an indicator LED 87 corresponding to the indicators 42 and 41, respectively, of FIG. 2. The service switch 50 may also be connected to the circuit 81. If further input/output devices are coupled to the control unit, such as external display devices or control systems, these may be coupled to the unit by way of further input/output lines 88, preferably serial communication paths which may be suitably isolated by opto isolators. The unit may comprise an internal power supply and regulator 89 connected to receive power from the postage meter low voltage power as shown in FIG. 3.

The above-discussed functions under the control of the control unit are thus functions which are not critical in the sense that loss of control or the contents of any register therein will not result in loss to the post office department, or to the user, of funds. These functions have been relegated to the control unit in order that the secure portions of the postal meter include only that programming of the system which must be secure. Additional functions that may be effected by the control unit, such as the addition of sequentially entered amounts may also be controlled by the program of the control unit, since such calculations are not critical to the security of the apparatus, and need not be effected within the physically secure portions of the postal meter. Similarly, the service resettable functions may be effected by the programming in the control unit, since these functions also are not critical to the accounting system and registers themselves. However, to retain these parameters in nonvolatile memory, retention in the accounting unit is desirable.

It will, of course, be apparent that, in a system such as shown in FIG. 4, further arithmetic keys may be provided, without great difficulty, such that the postage meter may be alternately employed also as a calculator.

Alternatively, the central processing unit and its control circuit may be augmented by a calculator chip or the like, connected to the keyboard and display for performing arithmetic functions.

While the control unit of FIG. 4, including all of the functions of the panel shown in FIG. 2 is preferably disposed directly on the postage meter to form a part thereof, it will be apparent that this portion of this system may be physically separate therefrom, or separable therefrom, whereby the postage meter itself may incorporate only the elements that are required to be physically secure.

Since monetary information and control is prevalent in the serial communication employed in the system, a high degree of integrity is mandatory. For this purpose, the system is designed, in the serial transmission communication sections, such that a transmitted bit is returned or "echoed" by the receiver thereof for checking purposes. If the transmitter thereby receives all of the echoed signals satisfactorily, it may issue a "no error" pulse, thereby informing the receiver of the information that the received information is valid.

Figure 5:
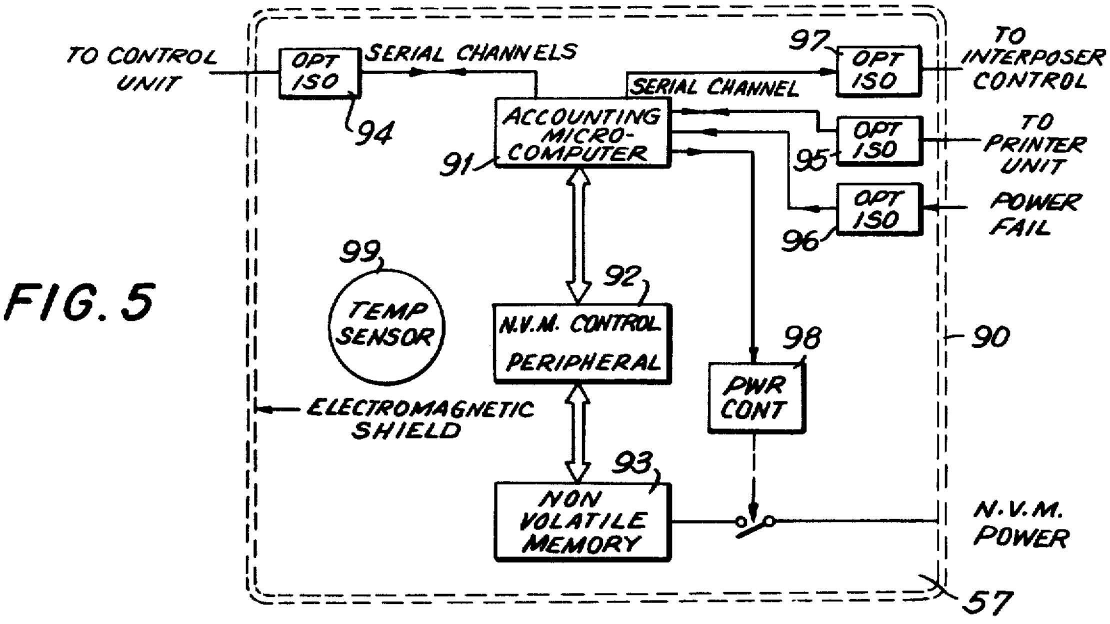
FIG. 5 is a simplified diagram of a circuit for the accounting system for a postal meter in accordance with the invention.

The circuit arrangement of the accounting compartment is shown in somewhat greater detail in FIG. 5, wherein the walls 90 of the compartment are illustrated as preferably forming an electromagnetic shield. The circuits include an accounting microcomputer 91 having a nonvolatile memory control 92 coupled thereto. The nonvolatile memory control controls the application of stored data between a volatile memory, which may form a part of the accounting microcomputer 91 and a nonvolatile memory 93. The volatile memories, such as random access memories, may function as working ascending registers, working descending registers, and the like. The accounting microcomputer also includes read-only memory control for the necessary accounting routines, as well as control routines. This unit may, in addition, incorporate serial interfaces, to enable its interfacing with the printing and control modules. The microcomputer may, for example, comprise the 8048 series microcomputer for Intel Corporation, Santa Clara, Calif., with a control circuit in a manner similar to that described above with respect to the control unit 75. In order to avoid damage to the accounting module by electric surges applied accidentally or intentionally, and to eliminate electrical noise induced via groundloops, the accounting microcomputer communicates with the devices external of the compartment 57 by suitable isolates that are not capable of applying voltage surges to the microcomputer. These isolators may, for example, be in the form of opto-electronic couplers, are also preferably arranged so as to be inaccessible from the exterior of the postal meter. One isolator unit 94 may be provided for the two-way communication path with the control unit. A further isolator arrangement 95 may be provided for the two-way communication with the printer unit, i.e., the printing module 56 of FIG. 3, in particular, the microprocessor circuit thereof. A still further isolator 96 may be provided for applying the power sensing signals to the microcomputer 91. In addition, an isolator 97 may be provided for controlling an interposer (not shown) in the printing module, for example, for mechanically blocking functions of the printer. Such a system is disclosed, for example, in U.S. patent application Ser. No. 024,812 filed Mar. 28, 1979 by R. McFiggans and A. Eckert, and assigned to the assignee of the present invention, the disclosure of which is specifically incorporated herein by reference.

The nonvolatile memory 93, at the present state of the art, is preferably in the form of an MNOS memory, which does not require a back-up power source. This memory may, however, alternatively be formed of elements which do require a power back-up, in which case a power control circuit may be employed to apply back-up power thereto external from the compartment 57. The purpose of the power control circuit 98 is to provide power to the MNOS memory for the purpose of effecting its data transfer operation, essentially during power up and power down. The program of the microcomputing unit 91 is organized to enter the contents of the registers of the computer units into the nonvolatile memory as soon as any indication of failure of the power supply occurs, and to restore this data to the working registers upon restoration of the power.

The thermostat 67 in FIG. 3 cuts off power to the meter in the event of high or low temperature operation. This automatically places the meter in its power down cycle, as a result of the power cut-off.

The compartment 57 may further comprise a temperature sensor 99, with suitable circuits (not shown) coupled thereto, such as to the microcomputer, for transferring data to the nonvolatile memory in the event of excess temperatures. The system may further be operative to prevent the operation of the interposer solenoid by way of the isolator 97, in the event of excess temperatures. It will be appreciated that the interposer is controlled by the microcomputer 91 also to inhibit operation of the printer in the event that insufficient postage remains for a printing operation, or other accounting data indicates that the unit should not be operative.

While the insolators have been indicated as individual units, it is, of course, apparent that these units may incorporate multiple devices, so that two-way communication is established in the respective circuits. It is further noted that systems for the transfer of data between volatile and nonvolatile memories are well known, and are disclosed, for example, in copending application Ser. No. 889,627 filed Mar. 24, 1978 now U.S. Pat. No. 4,224,506.

Figure 6:
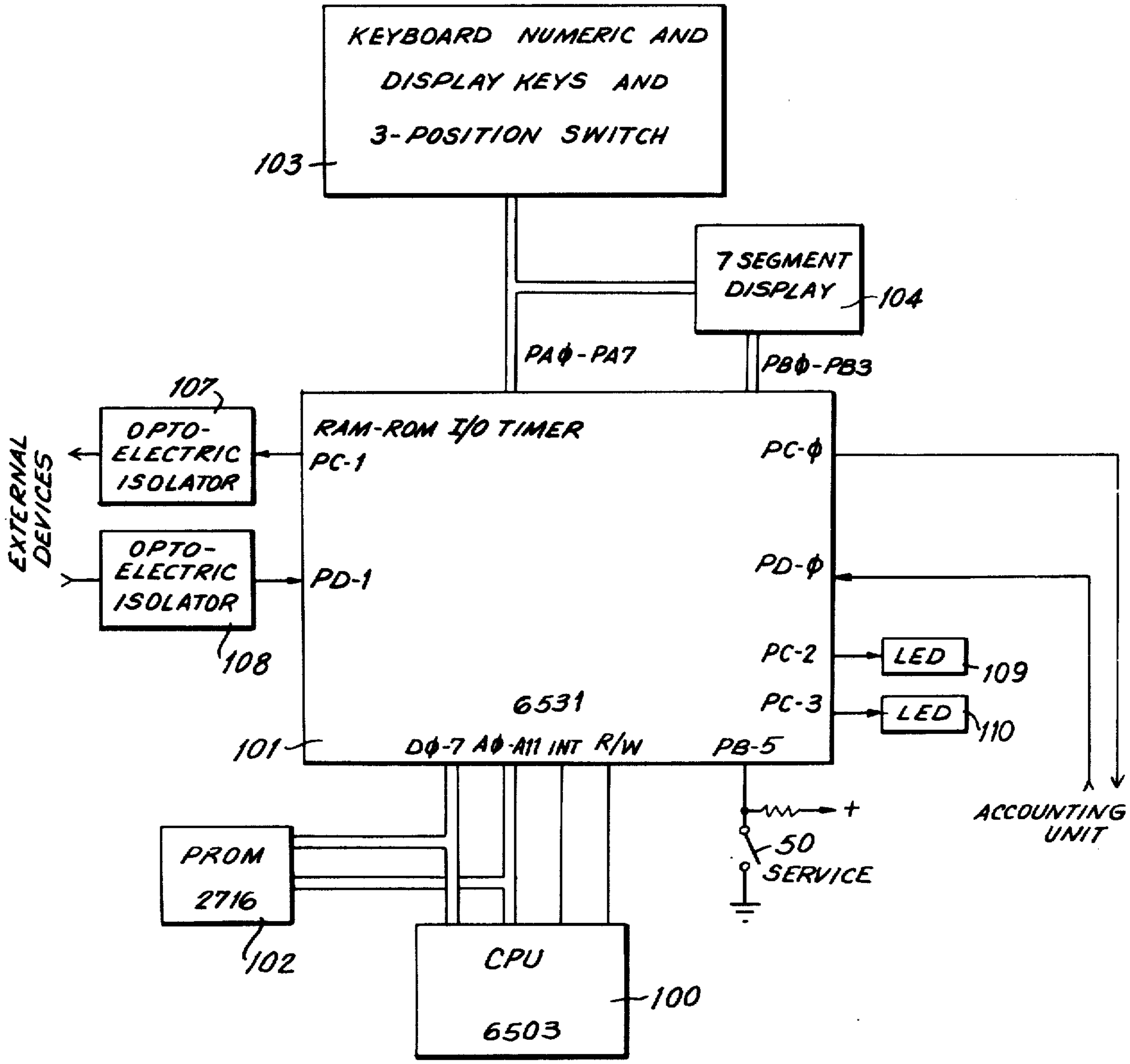
FIG. 6 is a more detailed block diagram of a preferred embodiment of the control unit for a postal meter in accordance with the invention.

Referring now to FIG. 6, therein is illustrated in greater detail a block diagram of a preferred embodiment of a control unit in accordance with the invention. In this figure the blocks have been identified by part numbers and terminals where applicable. This unit is illustrated as incorporating a type 6503 CPU 100 having its data and address lines coupled to RAM/ROM I/O timer circuit 101 as well as to a type 2716 PROM 102, the PROM 102 having stored therein the program for the control unit. Control lines, such as the interrupt line and read/write line may also be connected to the circuit 101. The circuit 101 has a plurality of ports, as will be discussed.

The control unit further incorporates the keyboard 103 including the numeric keys 31, the display keys 35–40, and the three-position switch 45 shown in FIG. 1. This unit also includes the add-through key 52 and the set postage key 34. All of these keys and switches are connected in a matrix to the circuit 101, in conventional manner, to permit the scanning of the keys and switches in accordance with the program, to detect a key or switch closure. The eight-line port A, as well as four lines of port B of the circuit 101, are also connected to the seven-segment display panel 104 for multiplexed display in the conventional manner. The circuit 101 is further connected by a pair of serial ports for connection to and from the accounting unit. In addition, a pair of further serial ports enable communication to and from external devices, by way of opto-electric isolators 107 and 108, respectively. Another output port of the adaptor is connected to LED 109 for indicating on the display panel that the dater door has not been closed. A further output port is connected to an LED 110 on the display panel for indicating that the operator's intervention is required to recock the trigger mechanism on the base. Finally, another port is coupled to the service switch 50, to enable the functions of the postal meter in the service mode.

In the preferred embodiment of the invention, the program of the control unit is directed to servicing of the keyboard unit, display panel, etc., so that the control functions and storage of data are effected primarily in the accounting unit. The program thereby includes those functions necessary for the scanning of the keyboard, multiplexing of the display, formatting of signals for communication with the other units, and with external devices, etc., so that any new information may be passed on to the accounting unit.

Figure 7:
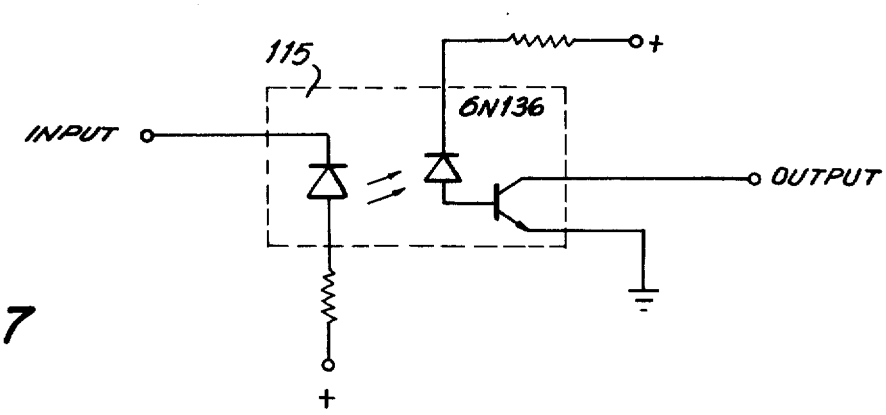
FIG. 7 is a circuit diagram of an opto-electric isolator that may be employed in the present invention.

A typical opto-electric isolator is shown in FIG. 7, this constituting primarily a conventional 6N136 device 115 including a solid state emitter for producing optical signals for reception by a photodiode, the photodiode being connected in the base circuit of a transistor amplifier.

Figure 8:
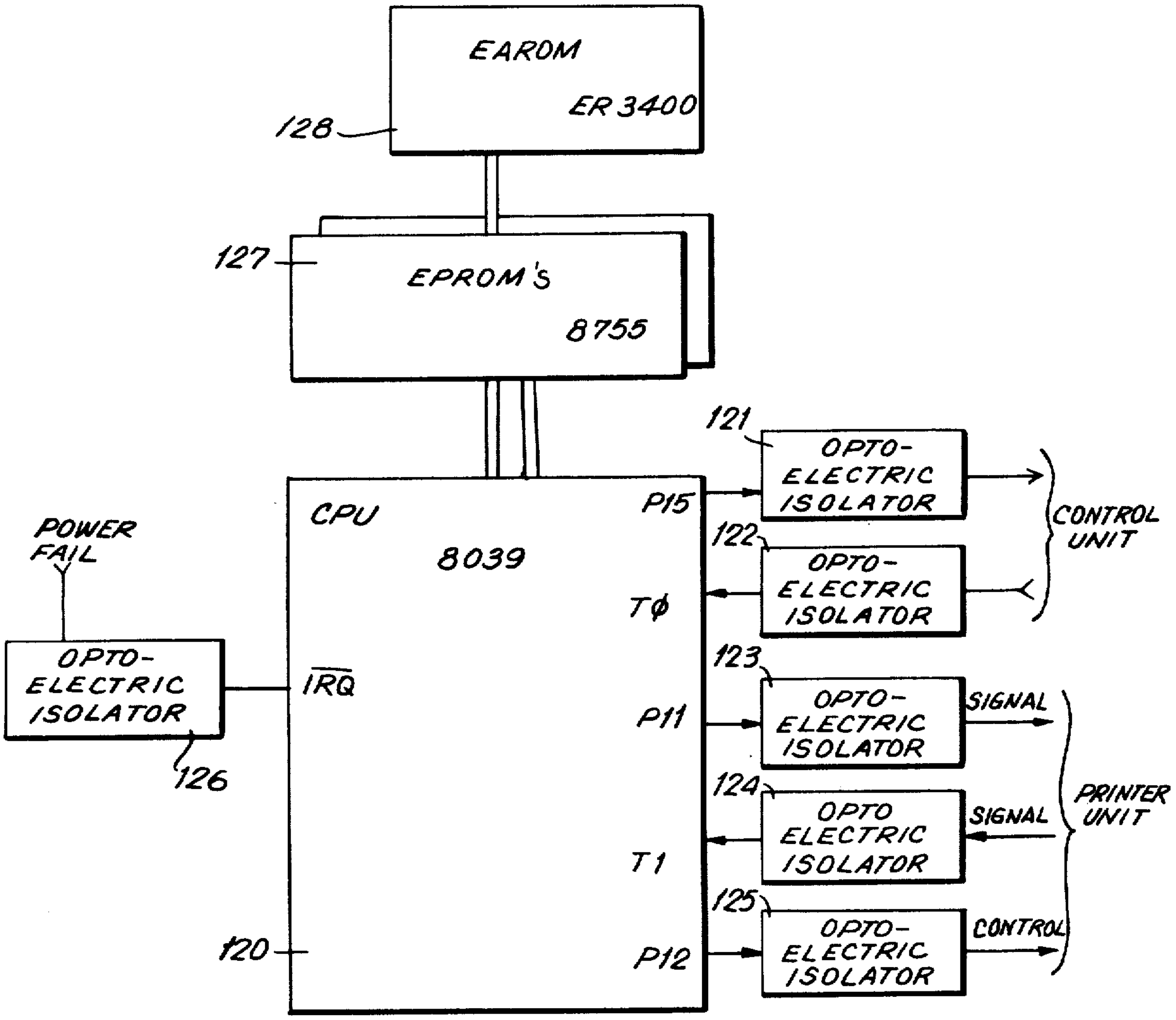
FIG. 8 is a more detailed block diagram of a preferred embodiment of an accounting unit in accordance with the invention.

A block diagram of a preferred example of the accounting unit is illustrated in FIG. 8, wherein a type 8039 CPU 120 is shown to communicate to the control unit by way of opto-electric isolators 121 and 122, and to communicate serially with the printer unit by way of opto-electric isolators 123 and 124. The opto-electric isolators 121 and 122 within the accounting unit thus may be connected directly to the corresponding leads of the control unit. The isolators 123 and 124 may be connected directly to the printer unit signal channels, since no further isolation devices are necessary for this purpose. In addition, a control opto-electric isolator 125, for controlling an interposer or the like in the printing unit may be connected to a further port of the CPU 120. Signals corresponding to a pending power failure are further fed to the interrupt port of the CPU 120, by way of opto-electric isolator 126. It is thus apparent that all signal and control to and from the accounting unit must be directed by way of opto-electric isolators, in order to insure the electrical and physical integrity of this unit. The accounting unit further includes a plurality of PROMs 127 coupled to the address and data lines of the CPU 120, each PROM 127 for example, being a E-PROM type 8755. This unit is connected to an electrically alterable read-only memory (EAROM) 128, for example, a type ER 3400, serving as a nonvolatile memory to store data at times during which the power supply to the postage meter has failed, or has been intentionally disconnected. The working memory for the accounting system, including the registers for storing all operational data, are provided in the CPU 120, this data being transferred to the electrically alterable ROM 128 at such time that a reduction of power is sensed. In order to insure the complete transfer of data, storage capacitors may be connected in conventional manner to store adequate power to insure the proper functioning of the circuit until the transfer of data has been effected.

Figure 9:
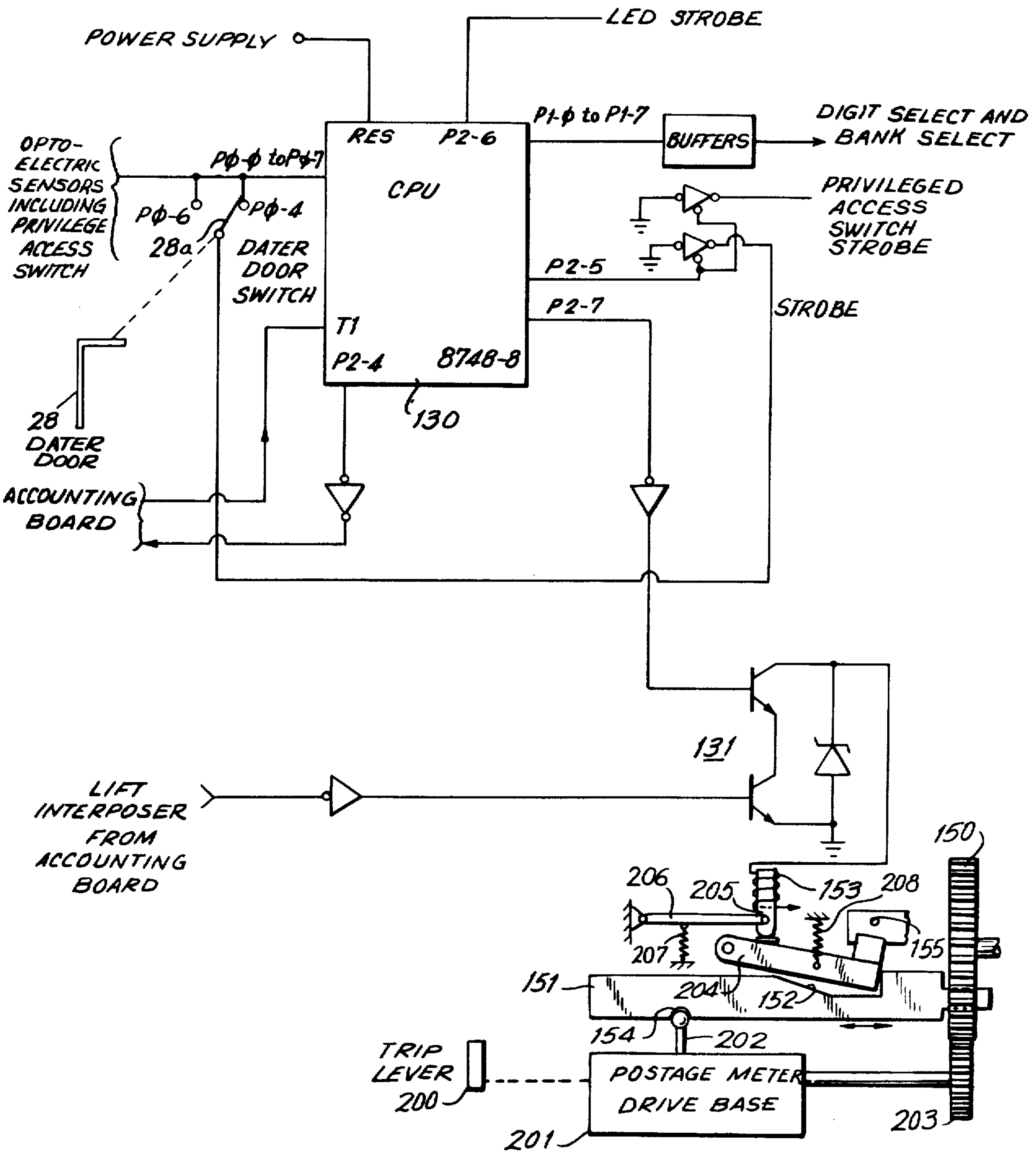
FIG. 9 is a block diagram of a preferred embodiment of the electrical system of the printing unit of a postal meter in accordance with the invention.

A preferred example of the circuit of the printing unit is illustrated in FIG. 9, this circuit consisting primarily of the CPU 130, for example, a type 8748-8, the CPU being connected by way of suitable buffers where necessary, to the I/O devices within the printing unit itself. The mechanical and optoelectric sensing systems in the printing unit are conventional and may be generally of the type disclosed, for example, in U.S. Pat. No. 4,050,374 aforementioned copending application Ser. No. 024,812, the disclosures of which are specifically incorporated herein by reference. Thus, the CPU is connected to a plurality of opto-electric sensors (not shown) for sensing of the positioning of the print wheels, these lines also being connected to enable the sensing of the privileged access switch 51 of FIG. 2. The privileged access switch 51 is located within the printing unit and is accessible only by way of a door sealed by the post office. These lines of the CPU are further connected to sense the position of the dater door, the dater door switch and privileged access switch being strobed by way of a further output of the CPU 130. The LEDs for the optical sensors are strobed at the proper times by way of another output of the CPU 130, and still further outputs of the CPU enable the stepping of the bank and digit stepping motors for the print wheels. In addition, the CPU 130 has a pair of ports for serially communicating to and from the accounting unit. Further, the interposer output from the accounting unit, and another output of the CPU 130 control a pair of transistors 131 for energizing the interposer solenoid, whereby the interposer solenoid 153 is not energized until all the preconditions are met both in the accounting unit and the printing unit. As a result, a printing cycle cannot commence unless the physical and electrical conditions in the meter are correct for normal printing. In the printing unit, it is therefore evident that the program is provided within the CPU itself.

Postal meters of the above-described form may be provided with several modifications. For example, in one modification, a remote charging feature is available whereby the key is provided for operation of the three-position charging switch on the keyboard. The operator of the unit may thus be provided with suitable combination for entry into the keyboard, to enable remote charging (i.e, away from the post office). In such units the privileged access switch is omitted.

In a further modification, the three-position recharging switch on the keyboard may be controlled by a simple knob, without the necessity of a key. In this type of a system, the meter may be manually recharged at the post office, but the service functions may be effected locally in a manner similar to that of remote recharging system type units.

In other words, recharging of a postal meter of the above type can be effected locally, if devices are provided with a key for the three-position switch, in which event further security is required as will be discussed later. On the other hand, in postal meters having a simple knob switch instead of the key switch, the "privileged access", sealed at the post office, is provided for manual recharging.

In the normal mode of operation of the system, as above discussed, the six display keys, when depressed, effect the display on the display panel of the six parameters above noted, i.e., the total in the ascending register of all postage that has been printed, the total remaining in the descending register of postage available, the control sum, the total number of printing operations of the meter, the value of postage printed and the number of pieces that have been printed since the last batch clear operation of the associated registers. The depression of these keys results only in the number of concern being displayed for a timed period after the key is released, for example, two seconds following which the display will return to the postage setting.

In either type of meter, if the service switch is placed in the service position, with the three-position switch still in the operation position, the display function of the display keys will be different. Thus, depression of the "postate used" key 35 will now result in a display of the current value set in the dollar unlock register in the machine, at or above which an operator cannot print postage. Postage values above this value require an additional depression of the set postage key for operation, in order to avoid accidental printing of excessive postage values. Depression of the "postage unused" key 36 will now result in a display of the value in the low postage warning register at which a warning should be given that the contents of the descending register are below a determined amount. Depression of the control or "postage sum" key 37, will now result in the display of the serial number of the postal meter. Depression of the "piece count" key 38 will now result in a display of the diagnostic status of the meter. This display provides an indication of the serviceman of possible misfunctions. A depression of the "batch value" key 39 will now result in a display of the maximum settable amount, i.e, the maximum amount set internally within the meter, above which the meter cannot set the print registers.

Depression of the "batch count" key 40 will have no effect in the service mode.

The three-position switch is used to effect recharging of the meter or to effect the change of values in the registers concerned with dollar unlock value, the low postage warning amount and the maximum settable amount.

With the Remote Meter Resetting System feature, positioning the three-position switch in either the "enter combination" or "enter amount" positions enables the customer to enter combination or amount respectively into the meter via the keyboard with indication on the display. Leaving the position enters the display value into the accounting unit and blanks the display for the next entry. Return of the three-position switch to the operate position will cause the accounting unit to complete the recharging routine and return the meter to normal usage with the recharging amount added to the postage unused register. The combination for the remote recharging feature is obtained from a remote recharging data center and is a random or pseudorandom number which changes with each recharging for security reasons.

For meters with the Manual Meter Resetting System feature, the recharging mode is effected by breaking the seal of the privileged access door, and flipping of the privileged access switch. The same sequence of operations of the three-position switch described above for recharging the meter are followed as in those meters having the remote charging feature. In the Manual Meter Resetting System machine only post office personnel are permitted to effect the change. The combination is a fixed number known only to the post office and is stored within the meter. Normal operation of the meter may proceed once the privileged access which has been returned to its operate position.

To change values in the registers concerned with dollar unlock value, the low postage warning amount and the maximum settable amount the serviceman would place the meter in the service mode by placing the service switch in the service position. The three-position switch is used as described above for the entry of combination and amount values. The meter will interpret the combination value to indicate which register is to be changed.

For the remote recharging system meter and the manual recharging system meter if an error has been made in entry, the occurrence of this error will be counted, as constituting evidence of tampering with the machine. When a determined number of such errors have been made, for example, 9, since the last recharging of the meter, then the function of the machine in recharging postage will be inhibited. The return of the meter to operating status in such circumstances may be effected at the post office. A discussion of the means to return the meter to full operating status is not of consequence to the present invention and relates to the security of the meter.

As above discussed, each of the three units of the postal meter has a microprocessor with a read-only memory defining a given program, and the communication between the units is effected serially and asynchronously. This is achieved in the first place by providing each of the computer systems with a crystal controlled clock. Further, the signals are defined such that the transitions thereof are closely controlled, whereby it is insured that, if a signal is present, it must be present within a given time period. As a still further insurance of the correctness of communication, the bits of a signal are returned to a transmitter as soon as they are received, for error checking at the transmitter, whereby a "no error" bit may be transmitted immediately following a data message if the data has followed correctly.

The program of the control unit responds to the status of the postal meter with respect to determined parameters. A register in the microprocessor of the accounting unit holds meter status information, for example, of two bytes, the bits of which digitally indicate if the meter trip mechanism requires recocking, if the dater door has not been opened following the last application of power or is presently open, if there are insufficient funds to allow printing of the amount set in the print wheels, if the low postage value has been reached, if the meter is in a service mode, if the meter is enabled, if the batch registers are clear, if a trip has been completed, or if various types of errors have occurred. The status message associated with these bits is not the same as the diagnostic message noted above that is employed in the service mode. The accounting unit keeps the control unit informed of the current status by transmitting status message to the control unit after power has been turned on and, thereafter, whenever a change in status occurs, the control unit responds to all such messages by insuring that the display on the meter is consistent with the status message as above discussed. These later steps may include, for example, the display of a row of decimals in the event of certain errors, the flashing of the decimal point in the event of low postage funds, the flashing of the entire display in the event of insufficient postage, the displaying of underscores in the place of blanks if the meter is in the service mode.

An interrupt program in the control unit interrupts the main program of the control unit at regular intervals in order to scan the keyboard and keyswitch, and to drive the display. In order to prevent the display of spurious characters which can be produced by sneak currents when more than one key is pressed, the interrupt program will cause the display to go blank instead. Such values as relate to time, keyboard, and keyswitch are maintained by the interrupt program for use by the main controller program.

The main program for the control unit includes the initializing steps, program steps for the transfer of messages back and forth between the accounting unit and external devices, and control of the timed display, the checking of the status message to insure that dater door and reset base lights are lit in accordance with the status, responding to the reported positions of keys, and three-position switch to ascertain changes of state therein so that the control unit subroutine which corresponds to the function defined for such a state or change of state will be executed.

The program of the accounting unit includes initializing procedures to insure that the working registers are brought up to date, and that no postage has been printed that has not been accounted for, as well as a power down processing program to effect the transfer of data to the nonvolatile (electrically alterable) memory in the event that the power is shut down or is failing.

The main program of the accounting unit effects the transmission of the meter status message to the control unit upon request or change in status, determines the effect of any currently entered postage value on the funding data currently registered and makes any necessary variations in the status message. The main program also controls the timing in the accounting unit for receiving messages from the control unit and the printer. The accounting unit program further includes subroutines for processing of signals in the bringing of the registers up to date when postage is to be printed, and for controlling the operation of the system when the meter is tripped. A further subroutine controls the bringing of the meter status message up to date. In addition an error checking routine which involves cyclical redundancy checking is programmed in the accounting unit software. This will be described in further detail below.

The program of the printer unit includes a main program having initializing steps, steps for scanning the sensors and controlling the strobes for the LEDs of the sensors, and the processing of messages for communication with the accounting system. Subroutines are provided for the setting of the postage wheels, to determine if sensor readings are proper, and to determine if any changes have been made in the outputs of the various hardware sensors and switches such as the privileged access and the dater door switch.

Considering in greater detail the addition of a calculator function to a postage meter, it is evident that this feature enables other charges, such as insurance, to be added to a base postage without the necessity for external calculation, so that the postage may be set in the print wheels simply by pressing the set key.

The result is not simply the combination of a calculator in the same case as a postage meter, since the keyboard and display are shared both by the "calculator" and the postage meter, as well as since the alternate functions of the elements must be coordinated with each other. Thus, the use of the display for some of the postal meter functions inhibits use of the calculator functions of the equipment, since such operation would be meaningless in the functioning of the device. In addition, the response of the postal machine to a depression of the ± key is dependent upon the origin of the data presented in the display. The arithmetic function must be operative with respect to data entered by way of the numeric keys 31 (and decimal key 32) or a postage setting display and hence depression of the ± key may either clear displays entered due to depression of other keys 35–40, or may be rendered inoperative, as in the case of operation of the key switch.

The system in accordance with the invention thereby requires a postage meter, a calculator input device, such as a keyboard, a calculator output device such as a display, and a control device which may, in accordance with the invention, be operating according to a given routine or program. The calculator input device, i.e., keyboard may be the sole input to the postage meter for the purpose of setting the print wheels thereof.

In a discussion of a program which may be employed, in accordance with the invention, it is to be understood that initialization of the system must automatically occur upon energizing of the system. In the following portions of the main program, it is further to be understood that the steps indicated are interrupted at periodic intervals, during which the interrupt program of the microcomputer in the control unit maintains timers and scans the keyboard and key switch, maintains the display, and assigns values to various variables and flags.

The program includes the following variables and flags:

1. KEYVAR, a variable indicating whether a new keyboard key has been pressed, and if so, which one.

2. BCDOWN, a flag indicating that both the meter batch total key and the clear key were pressed at the same time.

3. KEYMOD, a flag indicating that the first of a series of numeric keystrokes has been entered into the display.

4. SETBLD, a flag indicating that the value in the display was settable, i.e., produced in such a manner that the meter could be set to it. Error displays, for instance, are not settable.

5. SETNGD, a flag indicating that the value to which the postage meter print wheels are set is on display.

6. TIMEDD, a flag indicating that a temporary timed display is being made.

7. AROPRD, a flag indicating that a display is of such a nature as to be arithmetically operable upon.

8. RESSAV, a flag indicating that a series of arithmetic operations is underway and that an intermediate result is saved in an internal register.

9. PENDOP, a variable describing a pending arithmetic operation or the fact that no such operation is pending.

These flags and variables may be generated as a result of interrupt level and mainline level program steps, for example, in the microcomputer.

Figure 10:
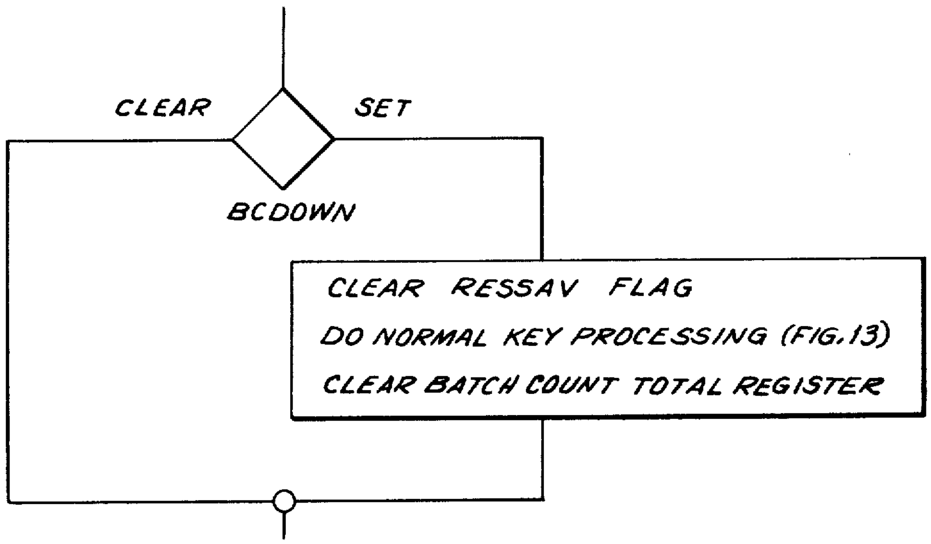
FIG. 10 is a flow diagram of the test for the BC DOWN signal.

FIG. 10 illustrates the test in the program for the occurrence of the BCDOWN signal. The flag BCDOWN controls a postage meter function, i.e., the clearing of the batch count total register. However, it also controls the clearing of the RESSAV flag, which in turn controls calculator functions that occur when the clear key or arithmetic function key are pressed.

The main postage meter control program uses the TIMEDD flag to control the termination of timed displays which may be the result of either postage meter operations or calculator operations; i.e., error messages from either source, or the display of the postage meter's batch count total register among others.

Figure 11:
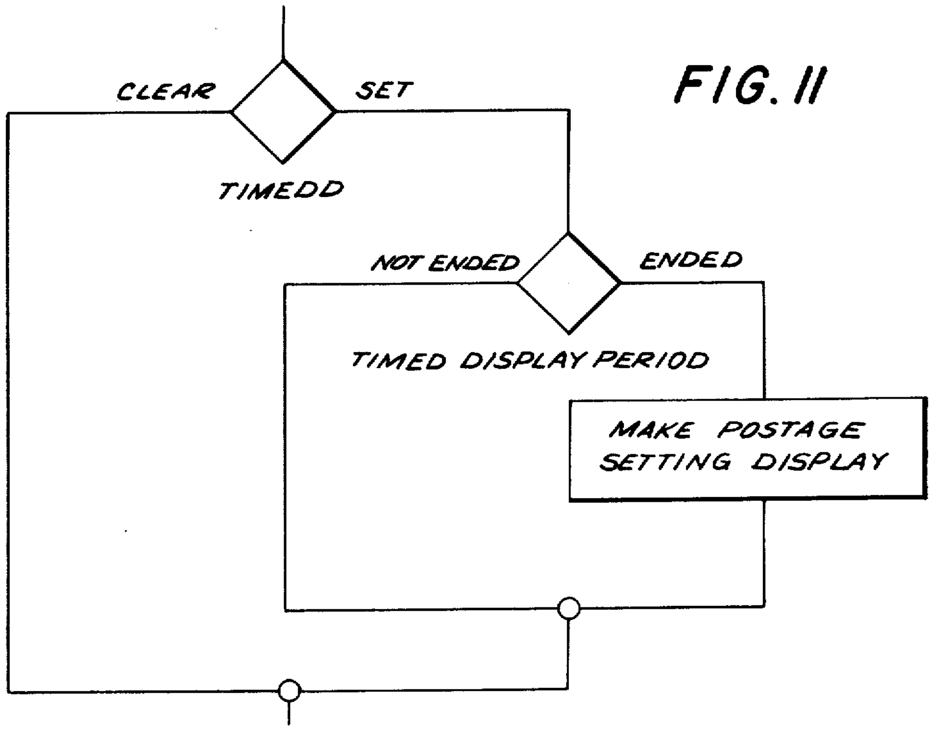
FIG. 11 is a flow diagram for the TIMEDD signal.

The response of the program to the test for the TIMEDD flag is illustrated in FIG. 11.

In addition to controlling the display of the setting of the postage meter the flag TIMEDD suppresses calculator functions that are attempted when the arithmetic function key is pressed.

Figure 12:
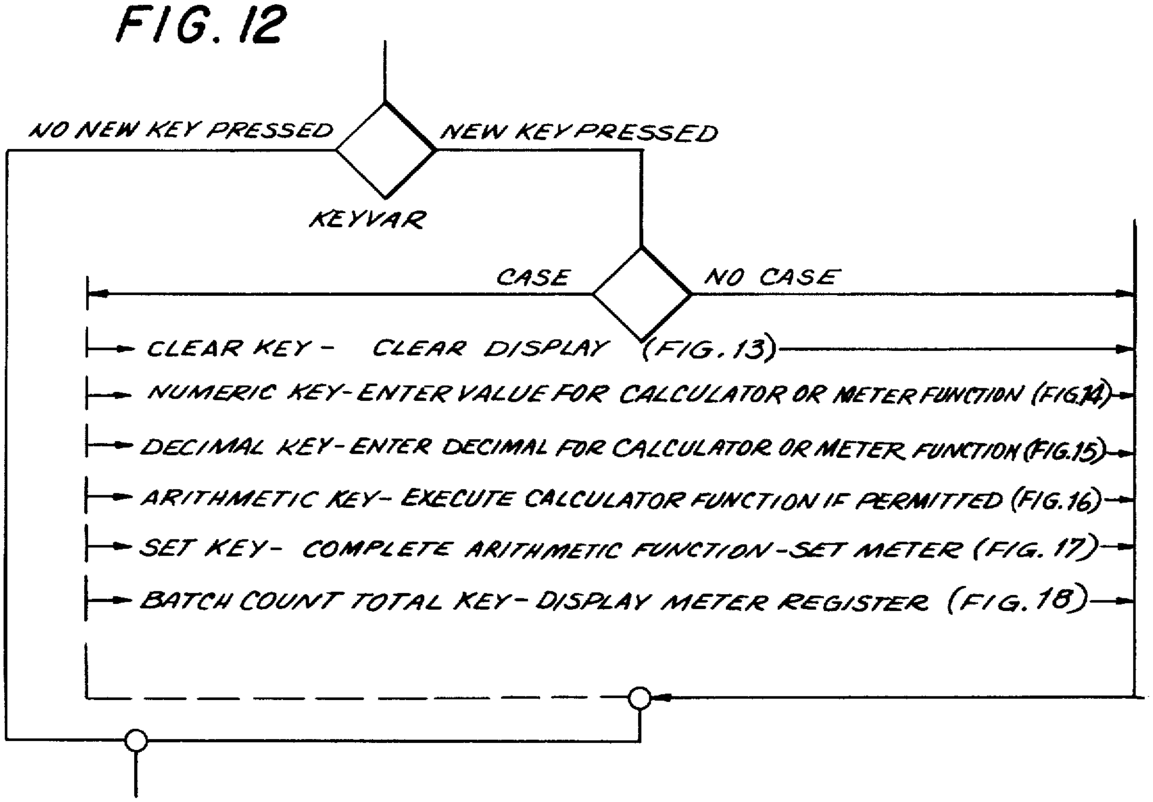
FIG. 12 is a flow diagram of the test for the depression of various keys.

The main postage meter control programs use the variable KEYVAR in such a way as to allow the microprocessor to execute functions which control both the postage meter and the calculator, as shown in FIG. 12.

It will be apparent that the portion of the program illustrated in FIG. 12 has been simplified for the purpose of illustration, whereby the tests for the depression of the various keys may, in fact, be more complex, although in accordance with conventional testing procedures. As indicated, the program proceeds in accordance with FIGS. 13–18 in dependence upon whether a clear key, numeric key, the decimal key, the arithmetic key, the set key or the batch count total key, respectively, have been depressed. Following the execution of the steps of one of the FIGS. 13–18, the main program of the postage meter system is continued in normal fashion.

Figure 13:
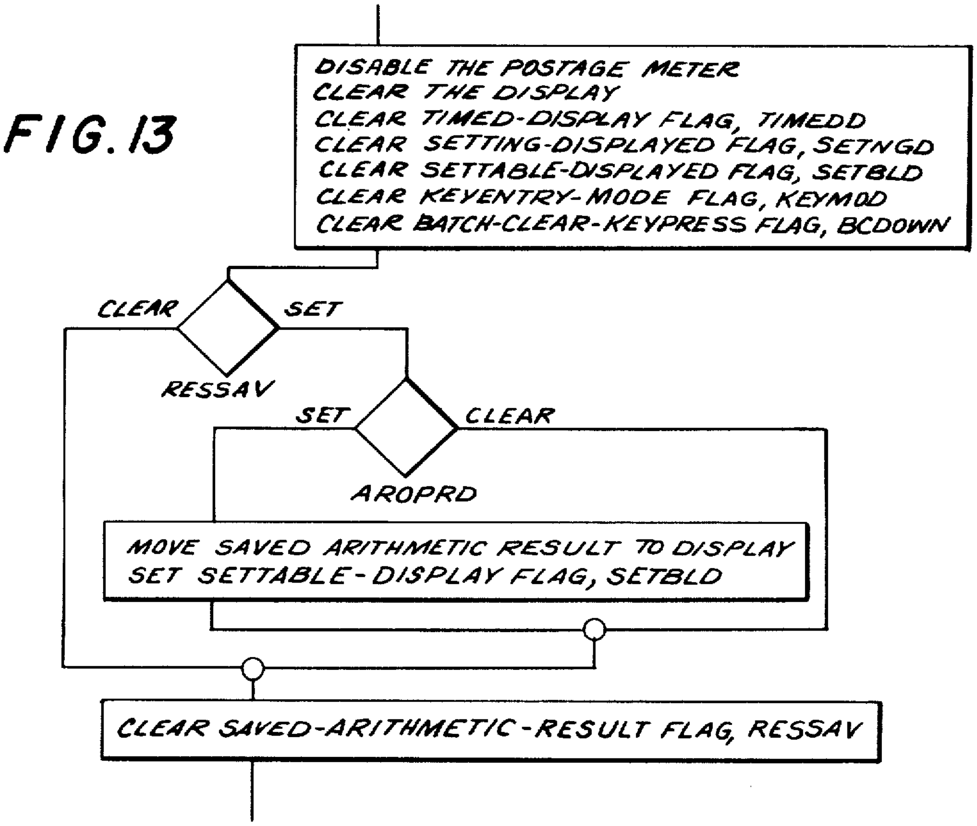
FIG. 13 is a flow diagram of the test for the depression of a clear key.
Figure 14:
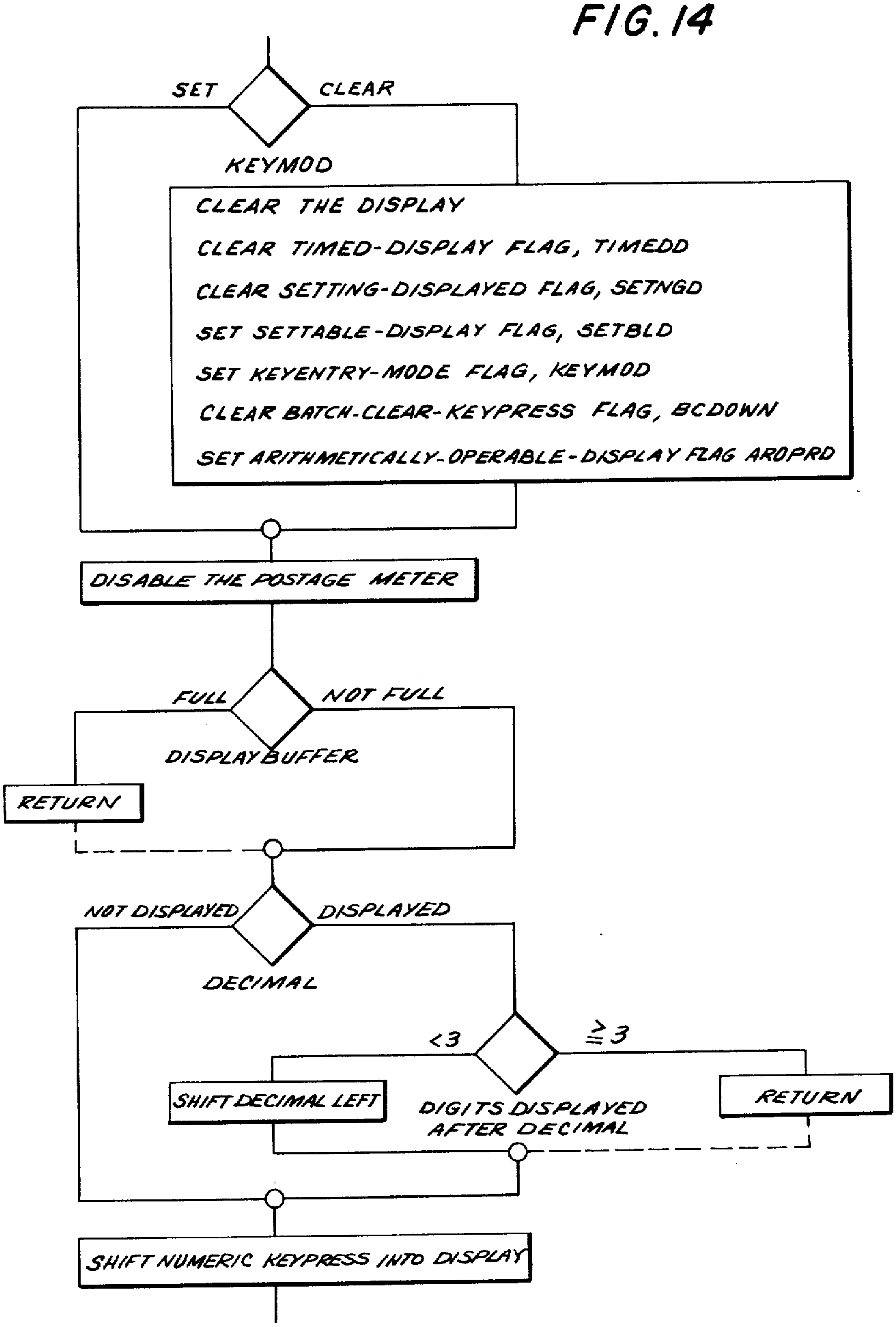
FIG. 14 is a flow diagram of the test for the depression of a numeric key.
Figure 15:
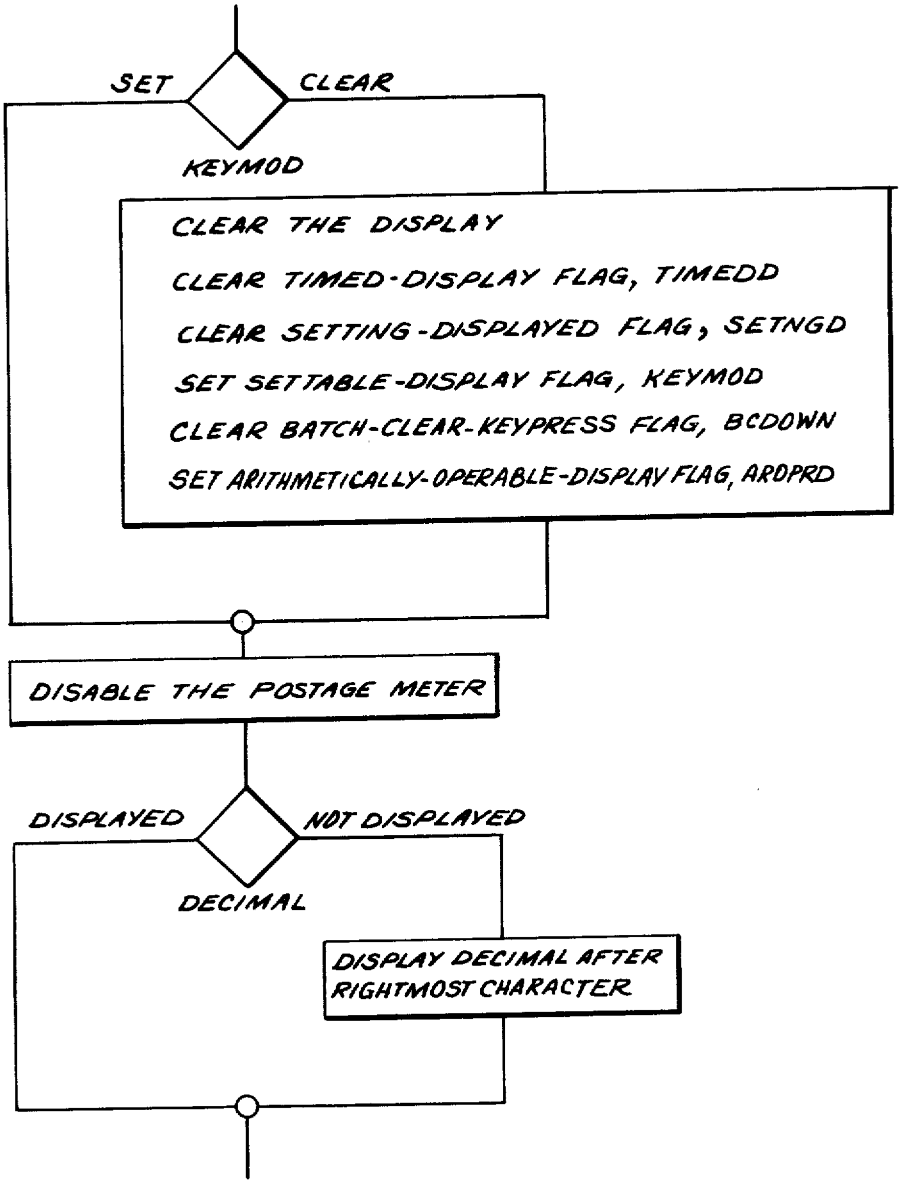
FIG. 15 is a flow diagram of the test for the depression of the decimal key.
Figure 16:
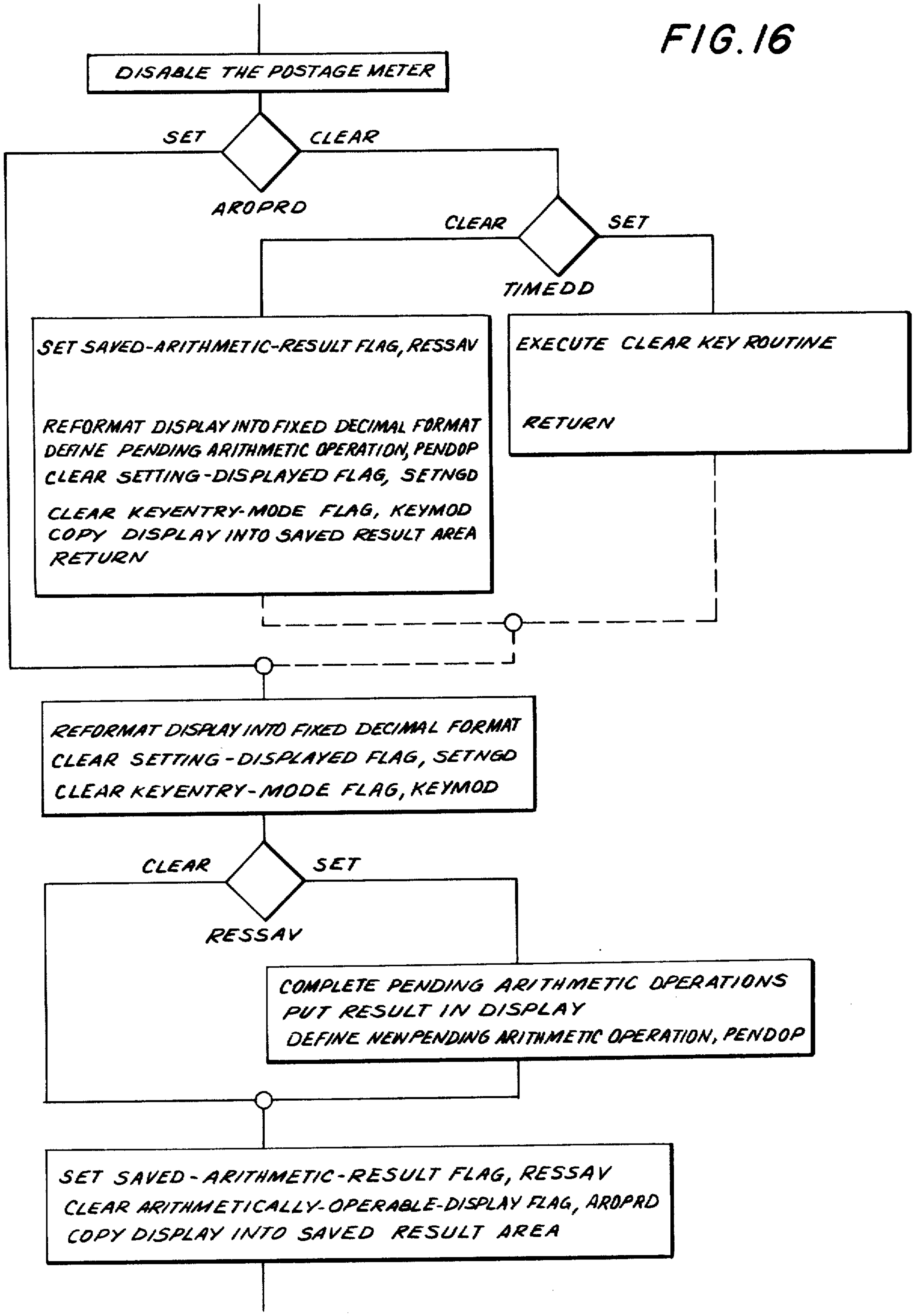
FIG. 16 is a flow diagram of the test for the depression of the arithmetic key.
Figure 17:
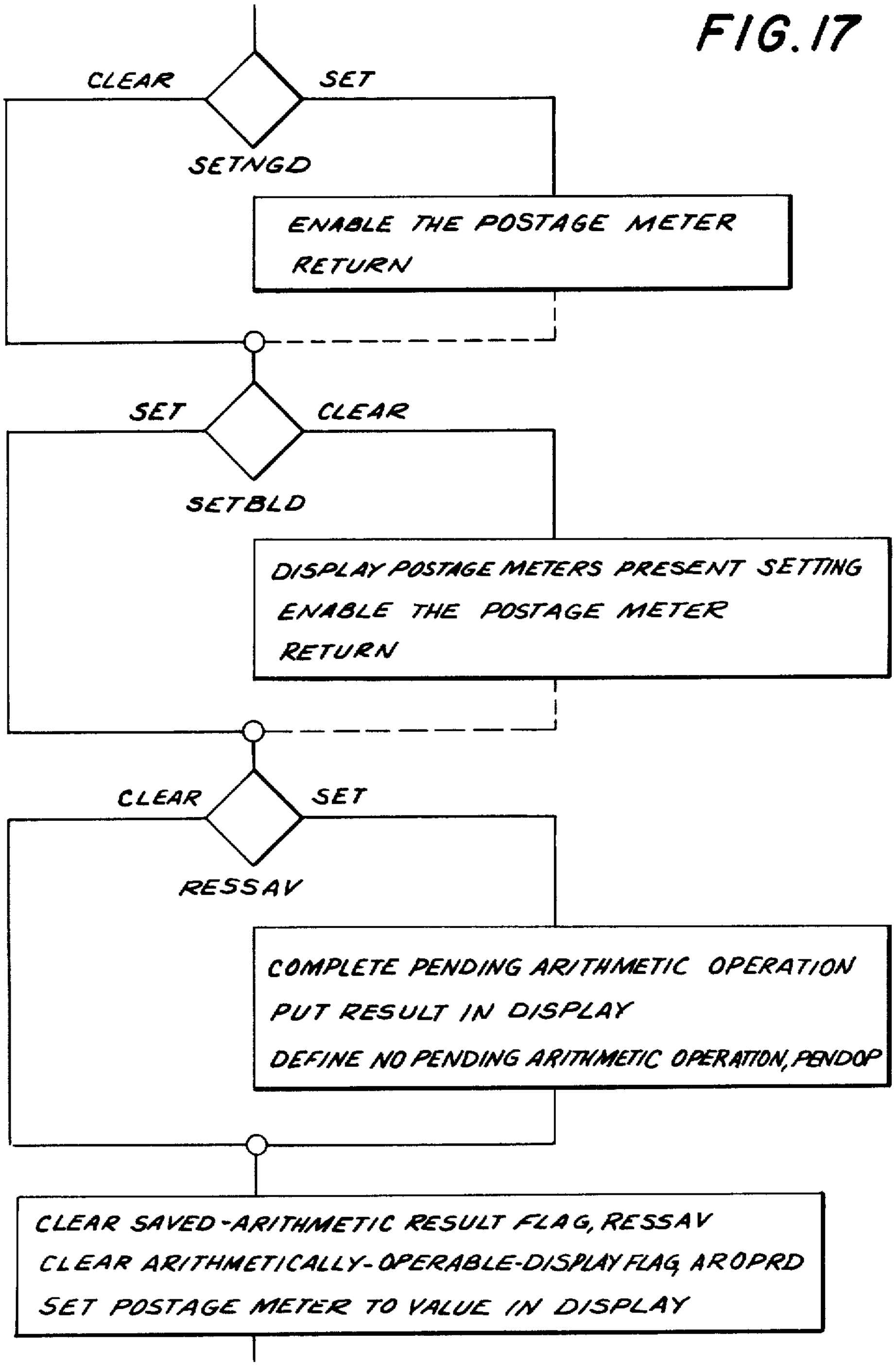
FIG. 17 is a flow diagram of the test for the depression of the set key.
Figure 18:
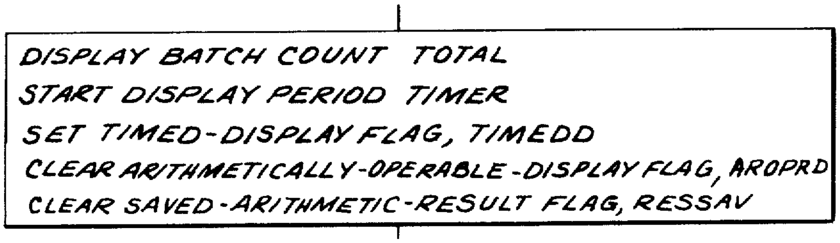
FIG. 18 is a flow diagram of the test for the depression of the count total key.

While the illustrated steps are self-explanatory, it will be noted, with respect to FIG. 13, that if a series of calculations have resulted in a saved intermediate result (the test on RESSAV), and a numeric value has been entered but not operated on (the test for AROPRD), and the clear key is then pressed, the intermediate result will be displayed. This intermediate result may either be cleared by a further depression of the clear key, or operated on by the depression of the arithmetic key followed by entry of the value to be added.

In the system in accordance with the invention, following setting of the print wheels of the printing mechanism, and the subsequent printing cycle to print the displayed postage setting value, the postage setting value will be retained in the print wheels and will continue to be shown in the display. As a consequence, postage values for the same amount may be printed on any desired number of envelopes or the like, without further steps being taken to restore the value by the use of the keyboard. Further, when the display keys 35-40 have been depressed for the momentary or timed display of the values stored in determined registers in the postal meter, the display will revert to the former postage set value, to which the postage wheels in the printing unit are already set. If, now, the function key 52 is depressed, a value may be added to the postage setting value in the print wheels. It is therefore apparent that the adding function is effective with respect to the postage set value in the meter, as well as to values just previously inserted into the keyboard. If, however, the function key 52 had been depressed during the display of the functions represented by the keys 35-40, the entire display would be cleared. As a consequence, it is apparent that the add key 52 serves other functions than those of similar keys in calculators and known postage determining systems. If the display is clear, a depression of the set postage key 34 will cause the setting of the print wheels to be displayed. It should be noted that depression of the set key will cause any pending arithmetic operation to be completed, and the resulting value will be set into the printing elements. Thus, depression of the set key at the end of one or more arithmetic computations obviates the necessity of a final depression of the key 52.

A complete flow chart of the software functions of the accounting, control and printing units is shown in greater detail in copending application Ser. No. 89,413, filed Oct. 30, 1979 and assigned to the assignee of the present invention. In addition, a complete printout of the programs actually contained within the permanent memory of each microprocessor in each of the accounting, control and printing units, respectively is disclosed therein. That disclosure is specifically incorporated by reference in this application.

Variations and modifications in the different functions performed by the operation of the apparatus of the present invention can be effected in accordance with changes in the various programs previously set in memory.

It is known and understood that the terms postage meter and postal meter, as used herein, refer to the general definition of a device for the imprinting of a defined unit value for governmental or private carrier parcel, envelope or package delivery, or other like application for unit value printing. Thus, although the term postal meter is utilized, it is both known and employed in the trade as a general term for devices utilized in conjunction with services other than those exclusively employed by governmental postal services. For example, private parcel or freight services purchase and employ postal meters as a means to provide unit value pricing for individual parcels, including accounting and printing functions.

The present invention is particularly directed to use in a postal meter which will employ varying features and functions, described in differing aspects, in any one or more of the following groups of copending patent applications, including this one, all filed concurrently: Ser. No. 89,425 to Eckert, et al, for "POSTAGE METER HAVING FIELD RESETTABLE CONTROL VALUES"; Ser. No. 89,426 to Eckert, et al, for "ELECTRONIC POSTAGE METER HAVING KEYBOARD ENTERED COMBINATION FOR RECHARGING"; Ser. No. 89,422 to Eckert, et al, for "ELECTRONIC POSTAGE METER HAVING CHECK DATE WARNING"; Ser. No. 89,427 to Eckert, et al, for "ELECTRONIC POSTAGE METER HAVING RESET BASE WARNING"; Ser. No. 89,434 to Muller for "ELECTRONIC POSTAGE METER OPERATING VOLTAGE VARIATION SENSING SYSTEM"; Ser. No. 89,412 to Eckert, et al, for "PRINT CONTROL SYSTEM"; Ser. No. 89,413 to Soderberg, et al, for "ELECTRONIC POSTAGE METER HAVING PLURAL COMPUTING SYSTEMS"; Ser. No. 89,411 to Eckert, et al, for "INTERPOSER CONTROL FOR ELECTRONIC POSTAGE METER".

While this invention has been disclosed and described with reference to a simple embodiment thereof, it will be apparent that variations and modifications may be made therein, and it is intended in the following claims to cover each such variation and modification as falls within the true spirit and scope of the invention.

What is claimed is:

1. In a postal meter having a secure housing incorporating therein a settable printing mechanism, an electronic accounting system including an electronic register for storing a value related to postage printed by said meter, and wherein said meter has an external numeric display and a keyboard having keys for introducing signals for the setting of said printing mechanism and keys for displaying other values, said keyboard further having an arithmetic function key and a setting key for initiating the setting of said printing mechanism, said arithmetic key initiating arithmetic modification in said display and not in said printing mechanism; the improvement wherein means are provided in said housing and responsive to operation of said setting key for enabling the completion of arithmetic modification of said display and the setting of said printing mechanism in accordance therewith.

2. The postal meter of claim 1, further including means operatively connected to said meter for initiating printing cycles of said printing mechanism, whereby print cycles of said printing mechanism effect the printing of postage in the amount exhibited by said display.

3. In an electronic postage meter having numeric keys enabling entry of amounts corresponding to postage to be printed, a display connected to indicate the value of postage to be printed, a settable printing mechanism, an electronic accounting means having an electronic register connected to store data corresponding to postage printed by said settable printing mechanism and operatively connected to means for initiating printing cycles of said settable printing mechanism; the improvement wherein said meter further has a function key for selectively modifying displayed amounts in said display in accordance with a given arithmetic function, said keyboard having further keys connected to enable the display in said display device of values stored in said accounting means, said function key being connected to be operative to clear the display and inhibit arithmetic operation when said stored values are being displayed.

4. The electronic postage meter of claim 3, wherein said arithmetic function key comprises an addition function key.

5. The electronic postage meter of claim 3, further including a second function key operable to both complete pending arithmetic operations and to set the result from said arithmetic operation into said settable printing mechanism.

6. The electronic postage meter of claim 5, wherein said settable printing mechanism includes a plurality of printing elements.

7. In a postage meter having a printing mechanism, an electronic accounting means including an electronic register, a source of first input signals corresponding to numeric values, means applying said signals to said accounting means, said accounting means being connected to set said printing mechanism, and further comprising a display coupled to indicate the numeric value to which said printing mechanism is set, a source of second signals, a source of third signals comprising a set postage key, means responsive to said second signal for arithmetically modifying said display in accordance with a first input signal, and means responsive to said third signal for setting said printing mechanism; the improvement wherein said means responsive to said third signal comprises means responsive to the depression of said set postage key for completing any arithmetic operations pending in the postage meter.

8. The postage meter of claim 7 wherein said source of first input signals comprises a keyboard connected to apply signals corresponding to numeric values to said accounting means, said source of second signals comprises an arithmetic function key.

9. The postage meter of claim 8 wherein said means responsive to said second signal comprises means for adding numeric values entered by way of said keyboard to a numeric value previously present in said display.

10. The postage meter of claim 8 comprising further function keys connected to enable displaying of other parameters related to the operation of said postage meter, and wherein said means responsive to said second signal comprises means responsive to the simultaneous display of other parameters on said display for clearing said display.

11. The postage meter of claim 10 wherein said further keys are connected to produce timed displays on said display.

12. The postage meter of claim 8 wherein said accounting means comprises a microprocessor system having a first program responsive to said first input signals for controlling the printing of postage in accordance with said first input signals, and a second program responsive to said second input signals for adding numerical values corresponding to the immediately proceeding values set in said keyboard to a previously stored value in said meter.

13. In a postage meter having a printing mechanism, an electronic accounting means including an electronic register, a source of first input signals corresponding to numeric values, means applying said signals to said accounting means, said accounting means being connected to set said printing mechanism, a display coupled to indicate the numeric value to which said printing mechanism is set, a source of second and third signals, means responsive to said second signals for arithmetically modifying said display in accordance with a first input signal, means responsive to said third signal for setting said printing mechanism, said source of first input signals comprising a keyboard connected to apply signals corresponding to numeric values to said accounting means, a source of second signals comprising an arithmetic function key, said source of third signals comprising a set postage key, and further function keys connected to enable displaying of other parameters related to the operation of said postage meter; the improvement wherein said means responsive to said second signal comprises means responsive to the simultaneous display of other parameters on said display for clearing said display.

* * * * *

UNITED STATES PATENT AND TRADEMARK OFFICE
CERTIFICATE OF CORRECTION

PATENT NO. : 4,280,179

DATED : July 21, 1981

INVENTOR(S) : Howell A. Jones, Jr. & Robert B. McFiggans

It is certified that error appears in the above-identified patent and that said Letters Patent are hereby corrected as shown below:

Column 2, line 58, insert -- more -- after "is"

Column 3, line 2, insert - - . - - after "postage"

Column 7, line 19, change "isolates" to - - isolators - -

Column 7, line 21, insert - - and - - before "are"

Column 8, line 38-39, change "connection" to -- communication --

Column 10, line 47, change "operation" to -- operate --

Column 10, line 64, change "of" to -- to -- (after "indication")

Column 11, line 35, change "which" to -- switch --

Signed and Sealed this

*Twentieth* Day of *March 1984*

[SEAL]

*Attest:*

GERALD J. MOSSINGHOFF

*Attesting Officer* *Commissioner of Patents and Trademarks*